Figure 1:
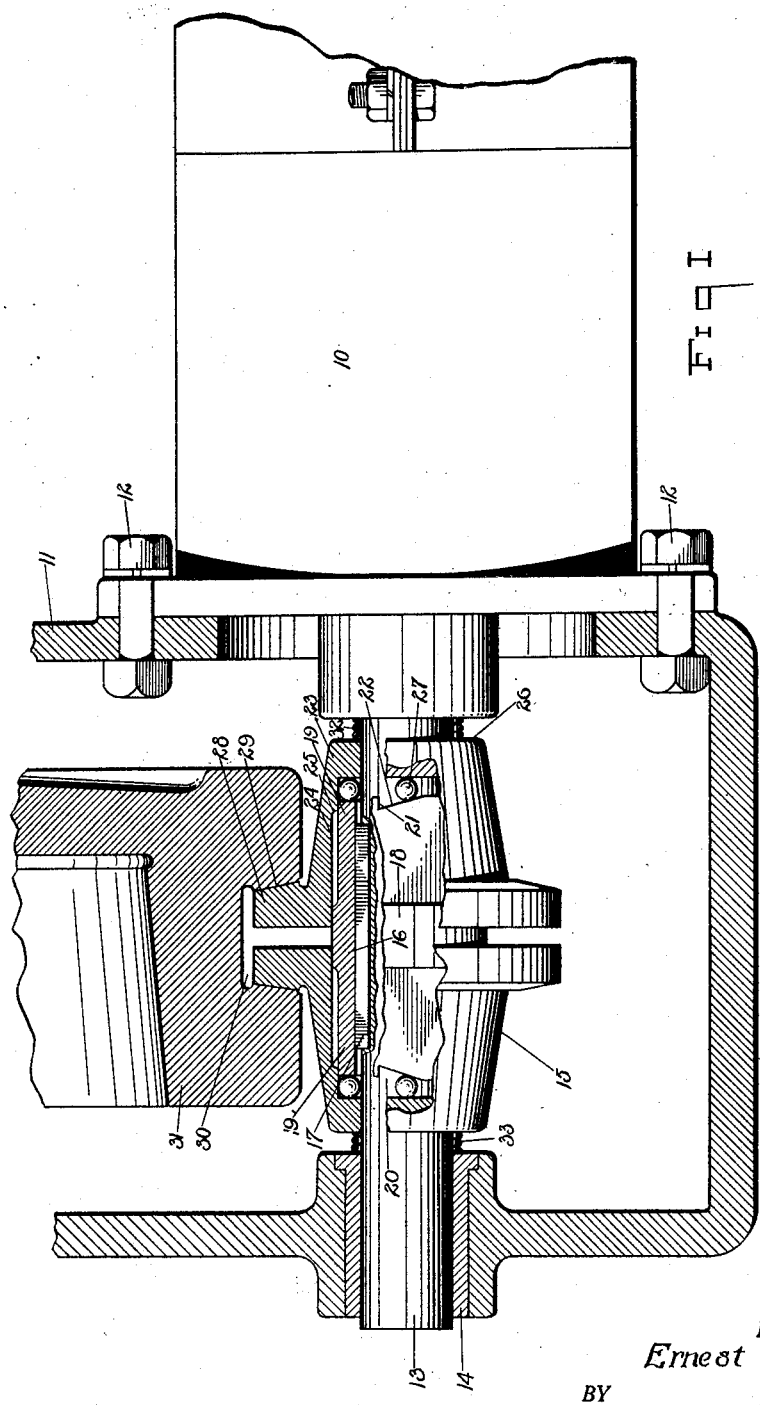

Aug. 25, 1931.  E. R. HUNTLEY  1,820,536
STARTER MECHANISM
Filed Oct. 6, 1920

INVENTOR.
Ernest R. Huntley
BY
ATTORNEYS.

Patented Aug. 25, 1931

1,820,536

UNITED STATES PATENT OFFICE

ERNEST R. HUNTLEY, OF MILWAUKEE, WISCONSIN, ASSIGNOR TO INDUSTRIAL RESEARCH CORPORATION, OF TOLEDO, OHIO, A CORPORATION OF DELAWARE

STARTER MECHANISM

Application filed October 6, 1920. Serial No. 415,157.

This invention relates to starting mechanism for engines and is intended to be used primarily with that type of starter which is associated with the fly-wheel of the engine and is adapted to make connection therewith. Starters of this type have been employed wherein a gear connection is made between the motor shaft and the fly-wheel of an internal combustion engine, but this type of drive is objectionable in that it is ordinarily requisite that disconnection of the gears be made, hence unless the gears readily mesh they are subject to severe strains and breakage resulting from improper operation.

One of the primary objects of this invention is to employ a type of clutch connection between the starting motor and the engine fly-wheel which is entirely frictional in nature. With such a type of drive it is immaterial as to the exact time or point of contact of the motor element and the engine element and consequently the difficulties resulting from improper gear connection are done away with.

My invention attains also as an object, the result following from the fact that after contact with the friction elements is made, the force of contact is entirely dependent upon the load driven so that only sufficient energy is derived from the motor and storage battery, in case an electric motor is employed, to turn the engine fly-wheel to start the engine.

A further object contemplated is the utilization of a type of drive wherein the connection to the fly-wheel and also the disconnection therefrom are made in a manner entirely automatic in nature. The attainment of this object is particularly desirable in connection with electric starters, in as much as injury to the armature of the motor and to its other working parts may result very easily if disconnection between the engine fly-wheel and motor shaft is not made instantaneously and automatically.

In connection with friction drives the ordinary type heretofore used have been subject to a lateral pressure upon the motor shaft tending to warp the same and it is therefore an important object of this mechanism to provide means for preventing, to a very large extent, any tendency to bend the motor shaft out of proper alignment.

Further objects and objects relating to economies of manufacture and details of construction will become apparent as I proceed with a description of that modification of my invention which I have shown in the accompanying drawing wherein is shown a longitudinal view partly in section of the motor and driving mechanism and a portion of the fly-wheel of the engine.

Briefly considered the invention resides in the employment of a one way clutch device fastened to the motor shaft, the clutching elements of which are slidable axially on the motor shaft and into engagement with the sides of a groove cut in the rim of the fly-wheel. I have shown a motor 10 attached to the fly-wheel casing 11 by bolts 12 and which is provided with an extended motor shaft 13, the outer end of which has bearing in a bushing 14 fixed within a corresponding portion of the fly-wheel casing. Between the bearing 14 and the motor is the one way clutch which I have indicated as 15. In its elements this clutch is formed of a cylindrical band 16 fixed to the motor shaft by a key 17. This band has its maximum diameter at its center 18 and adjacent either end a surface is cut away to form portions of lesser diameter 19, for a purpose hereinafter to be described. The side edges of this band 16 are cut away to form a series of notches 20 one of the surfaces of each notch being parallel to the axis of the shaft as at 21 and the other surface 22 being inclined so that it converges toward the center 18 of the band in the direction in which the motor shaft normally rotates to operate the clutch.

The band 16 as above described with its inclined or notched edges forms the wedging element of the clutch.

The driven portion of the clutch consists of two slidable elements mounted upon the band so as to engage the fly-wheel and at the same time make connection with the central band. In as much as these two driven elements are identical in shape, one only will be described, similar reference characters referring to like parts.

The movable element 23 is approximately cylindrical in form and has a larger diameter which is adapted to have sliding engagement with the central portion 18 of the band and a portion of lesser diameter 25 which is adapted to have sliding engagement with the end portion 19 of the band 16. The outer end of the cylindrical member is formed with an internal radial flange 26 which extends to the motor shaft and may have a bearing thereupon. This flange, as is apparent from the drawing, is adjacent the edge of the band 16 with the notches therein so that a series of housings formed at each notch encircles the motor shaft. Within each of these housings is positioned a ball or roller 27 which, when in the portion of the housing wherein the notch is nearest the center of the band, is freely movable, but which, when at the other extremity of the inclined portion of the notch, is wedged in between the annular internal flange of the movable member 23 and the inclined edge 22 of the notch.

The inner end of the cylindrical member 23 has integrally formed therewith an external flange 28 and the outer surface of this flange is adapted to contact with the inner side 29 of a groove 30 cut in the periphery of the fly-wheel 31 of the engine to be started.

Positioned between the internal flanges of the two sliding elements hereinbefore mentioned, and the motor on the one end and the bushing 14 on the other, are two spiral springs 32 and 33 which are normally under compression and tend to urge the movable members of the clutch inwardly with reference to the band and thereby disengage the friction members from the fly-wheel.

The normal operation of the clutch is as follows: The motor has a direction of rotation such as to cause the balls or rollers 27 to move outwardly along the inclined surfaces 22 of the notches. This movement results in a wedging action by the rollers against the slidable members 23 which forces them outwardly in relation to the band, simultaneously bringing the external flange elements 28 into engagement with the inner surfaces of the groove 30 in the engine fly-wheel. The degree of pressure exerted by the rollers upon the movable members of the clutch is, of course, dependent upon the resistance offered by the load of the engine so that the greater the load the greater the pressure exerted between the friction elements and thus the more assured the drive connection between the motor shaft and fly-wheel.

As soon as the engine has started under its own power the fly-wheel accelerates very rapidly carrying therewith the movable members which, in as much as their speed is temporarily in excess of that of the motor shaft move the rollers into the area of the housings where they can exert no wedging action and the springs 32 thereupon are free to exert their pressure and move the friction members out of engagement with the fly-wheel.

As previously indicated, there are two of these movable members 23 and due to the fact that their movement is axial along the motor shaft, pressure is exerted upon the fly-wheel also in this direction so that a very little lateral pressure is made upon the motor shaft, thus removing to a maximum degree any warping tendency.

It should be observed that motion to the movable members is imparted by virtue of the inertia of these members in relation to the acceleration of the motor shaft. At starting, the sudden speeding up of the motor shaft causes the relatively heavy movable elements to slip and thus the wedging action is aided. However, if, after the engine has started, the operator fails to disconnect the electrical connections, assuming that an electrical motor is employed, the speed of rotation of the movable members and the motor shaft will be approximately equal and hence there will be little, if any, inertia effect tending to cause the movable members to slide into contact with the fly-wheel. This result is very advantageous in as much as there will be little opportunity for breakage due to carelessness on the part of the operator.

I am aware that the particular embodiment of my invention described and illustrated in the accompanying drawing is susceptible of considerable variation without departing from the spirit thereof and therefore I desire to claim the same broadly as well as specifically as indicated by the appended claims.

I claim as my invention:

1. The combination of an engine member; a motor having an extended shaft; a cylindrical band secured to said shaft extension; said band having edges formed in a plurality of notches with relatively inclined surfaces; a plurality of annular friction elements slidably mounted on said band, each of said elements having an inner radial flange at one end and an outer radial flange at the other end; said inner flange having bearing on the shaft adjacent the band edge and said outer flange having bearing on the sleeve; and a plurality of balls placed in the notches between said inner flange and band, said balls being adapted to wedge the friction elements into contact with the engine member when the motor is driving the engine.

2. In an engine starter the combination of an engine member; a motor having an extended shaft; a band fixed to the shaft; a portion of the edge of said band being inclined inwardly to form a notch; an annular friction member slidably mounted on the band, said friction member having an edge turned inwardly adjacent the notched band edge to form with said notch a housing, and said friction member having an edge turned outwardly to form a friction flange adapted to contact with the engine member; a ball in said housing between the notched band edge and the inwardly turned edge of the friction member; and resilient means adapted to move said friction member out of engagement with the engine member.

3. In a starter mechanism for engines the combination of an engine wheel having a radial groove cut in the periphery thereof; a motor having a shaft extended in juxtaposition to said groove; a cylindrical band fixed to the motor shaft, the edges of said band having a plurality of notches cut therein so that one of the faces of each notch is parallel to the shaft axis and the other face of each notch is inclined inwardly toward the band center in the direction of the normal rotation of the shaft; two approximately cylindrical members mounted on the band so as to have sliding and rotative contact therewith; and outwardly extending flange integral with each member, having bearing on the band adjacent its middle portion and extending into the fly-wheel groove, said flange being adapted to contact with a wall of the groove; an inwardly extending flange integral with each member, said inwardly extending flange forming with the inclined band edge a series of wedge shaped housings; a plurality of rollers placed one in each housing; and resilient means tending to move said members out of contact with the walls of the groove.

4. A clutch device for engine starting mechanism, comprising a motor shaft; a band comprising the power element of the ball-clutch device, said band having its edge formed in a plurality of inclined wedging surfaces; a sleeve slidably mounted on the band and forming the driven element of the ball clutch device, said sleeve having an end projecting over the band edge and turned inwardly to form a flange; an outwardly turned flange at the other end of the sleeve, adapted to have frictional contact with the load to be driven; a plurality of balls, one ball having a position between each inclined wedging surface of the band and the inwardly directed flange of the sleeve; and resilient means associated with the sleeve normally tending to urge the sleeve and connected friction flange out of contact with the load.

5. In drive mechanism, the combination of a driving shaft; a gear adapted to be driven having an annular groove formed in its periphery; and a power transmitting element slidable on said shaft; wedging means adapted to cooperatively engage a wall of said groove when the shaft is rotated in one direction, and to disengage it with said grooved wall when the shaft is rotated in the opposite direction and means to normally hold said element in disengaged position.

6. In a starter mechanism, the combination of a driven member, a driving shaft; a plurality of driving elements slidably mounted on said shaft; means for moving said driving elements away from each other forming a wedging connection between the driving element and shaft; and additional means forming a frictional connection between the driving element and member to be driven.

In testimony whereof, I affix my signature.

ERNEST R. HUNTLEY.